(No Model.)  5 Sheets—Sheet 1.

G. GUNTZ.
SAND MOLDING MACHINE.

No. 360,012.  Patented Mar. 29, 1887.

WITNESSES:
H. S. Reets
Geo. H. Montgomery

INVENTOR
Geo. Guntz
BY Herbert W. T. Jenner.
ATTORNEY (No Model.)

G. GUNTZ.
SAND MOLDING MACHINE.

No. 360,012. Patented Mar. 29, 1887.

(No Model.)  5 Sheets—Sheet 3.

G. GUNTZ.
SAND MOLDING MACHINE.

No. 360,012. Patented Mar. 29, 1887.

WITNESSES:
H. S. Reets
Geo. W. Montgomery

INVENTOR
Geo. Guntz,
BY Herbert W. S. Jenner,
ATTORNEY (No Model.) 5 Sheets—Sheet 4.
G. GUNTZ.
SAND MOLDING MACHINE.
No. 360,012. Patented Mar. 29, 1887.
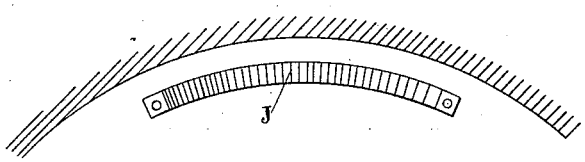
Fig. 4
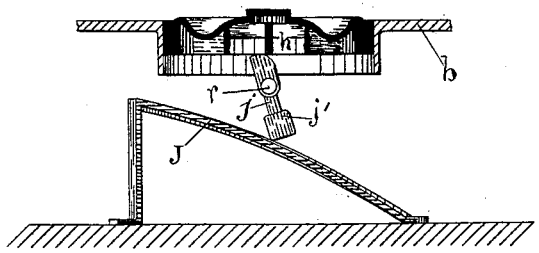
Fig. 5
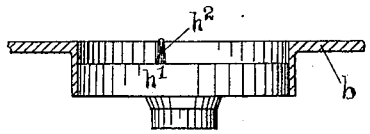
Fig. 6
WITNESSES:
INVENTOR
Geo. Guntz,
BY Herbert W. T. Jenner.
ATTORNEY (No Model.) 5 Sheets—Sheet 5.

G. GUNTZ.
SAND MOLDING MACHINE.

No. 360,012. Patented Mar. 29, 1887.

WITNESSES:
H. S. Keets
Geo. H. Montgomery

Geo. Guntz
INVENTOR

BY Herbert W. T. Jenner
ATTORNEY

UNITED STATES PATENT OFFICE.

GEORGE GUNTZ, OF WILKES-BARRÉ, PENNSYLVANIA.

SAND-MOLDING MACHINE.

SPECIFICATION forming part of Letters Patent No. 360,012, dated March 29, 1887.

Application filed September 11, 1886. Serial No. 213,287. (No model.)

*To all whom it may concern:*

Be it known that I, GEORGE GUNTZ, a citizen of the United States, residing at Wilkes-Barré, in the county of Luzerne and State of Pennsylvania, have invented certain new and useful Improvements in Molding-Machines; and I hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to molding-machines for use in the manufacture of car-wheels; and it consists in the novel construction and combination of the parts hereinafter fully described and claimed.

Figure 1:
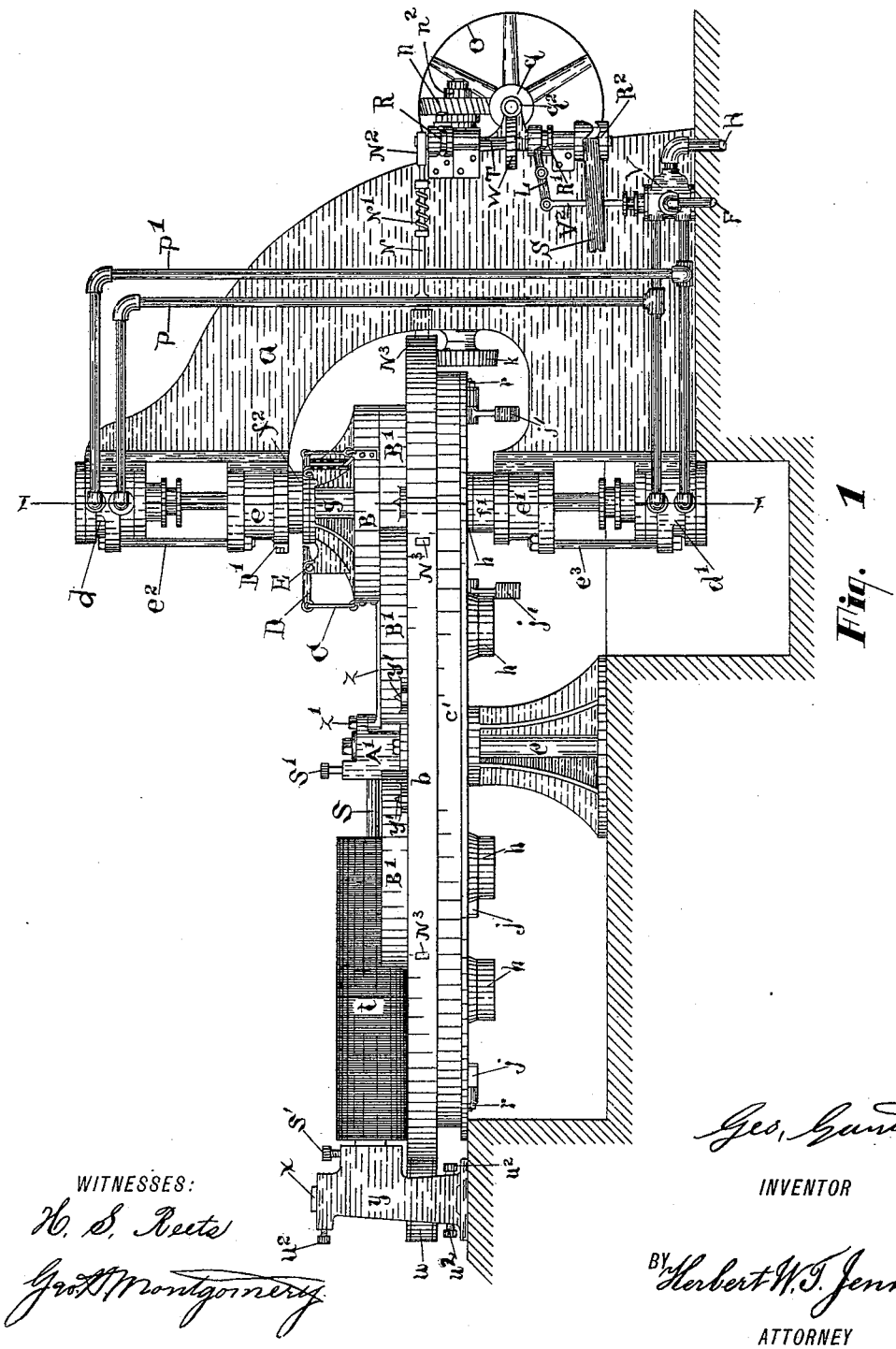
Figure 2:
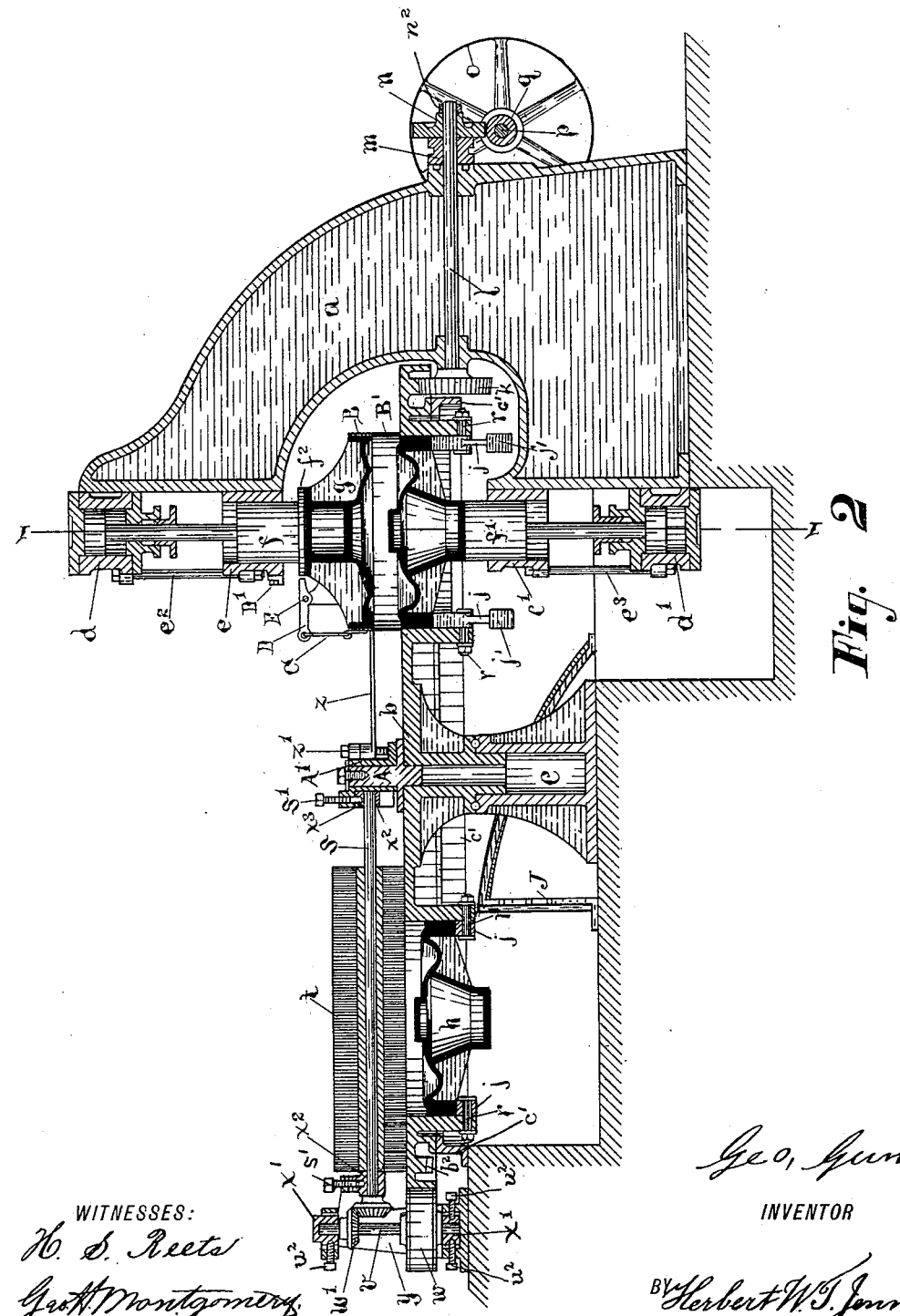
Figure 3:
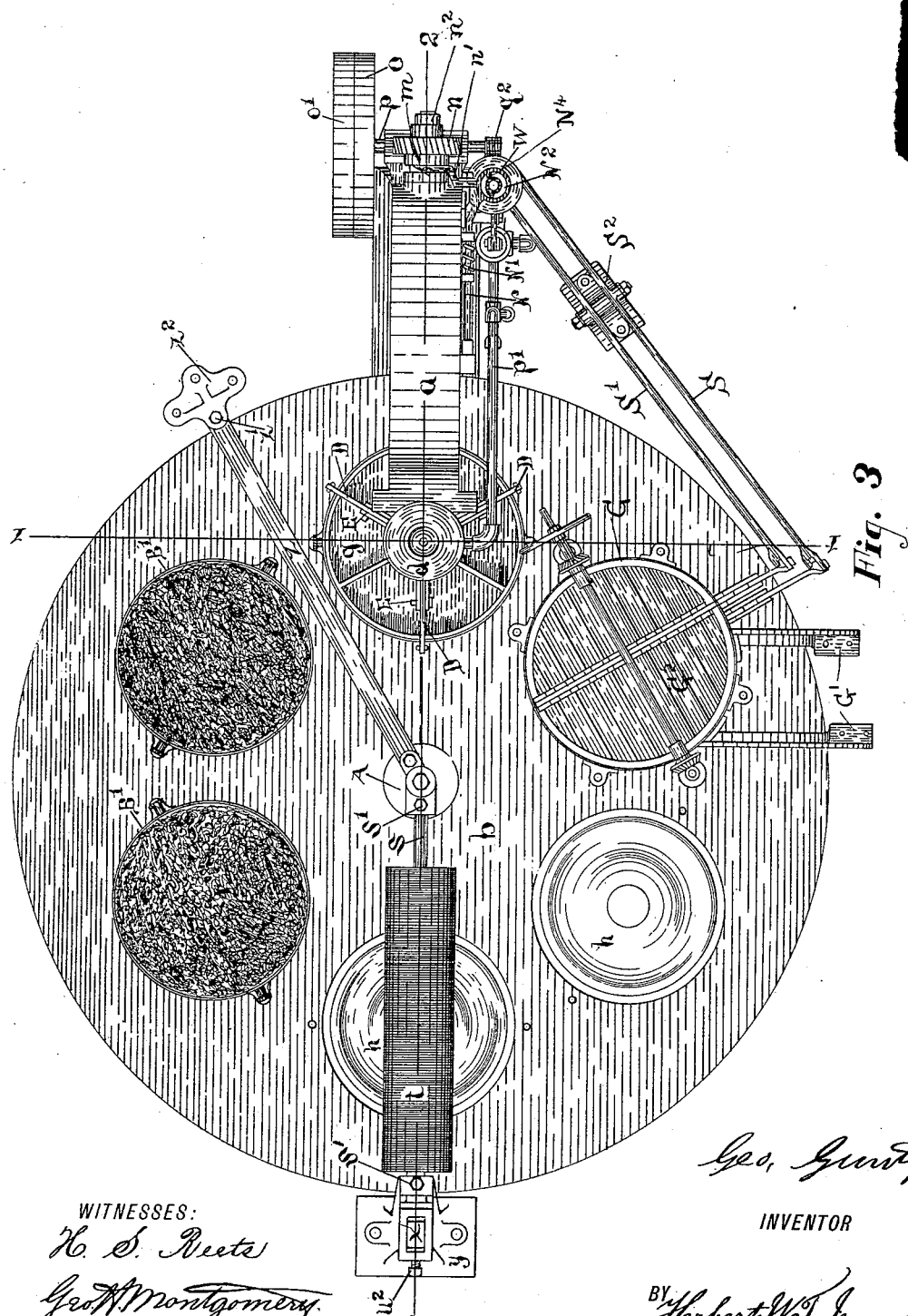
Figure 10:
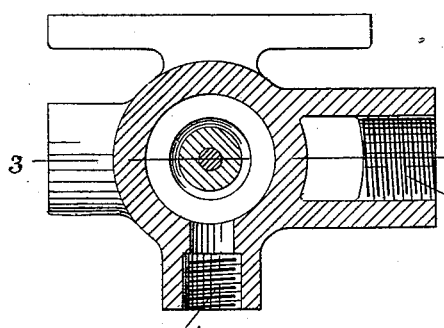
Figure 9:
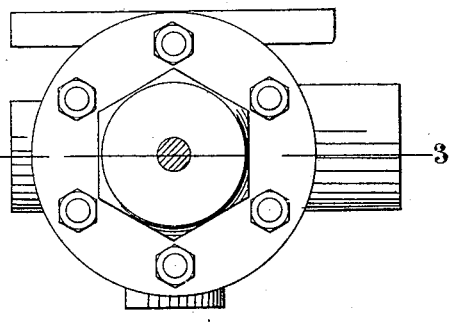
Figure 8:
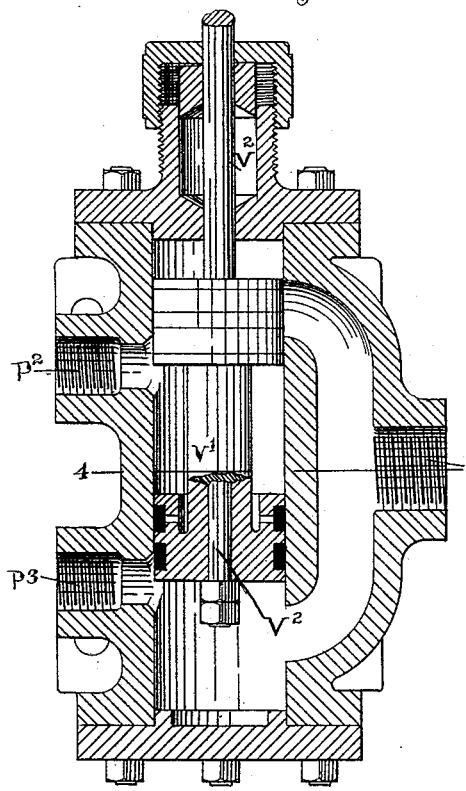
Figure 7:
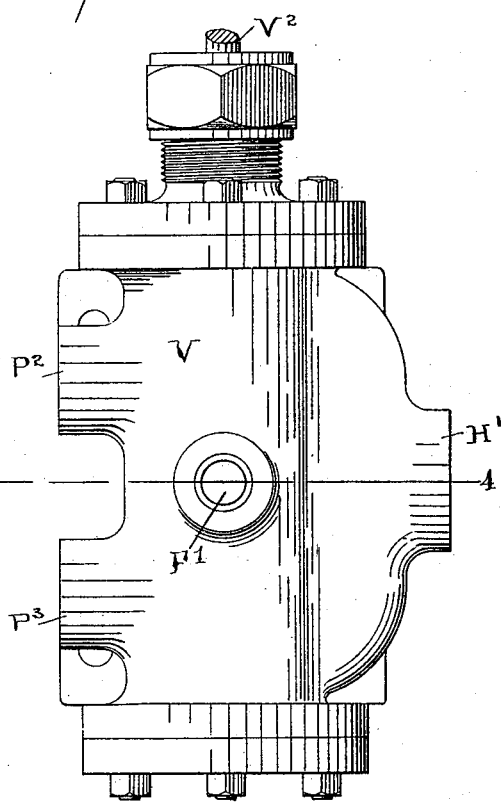

In the drawings, Figure 1 is a side view of the machine with the sand-reservoir removed. Fig. 2 is a vertical longitudinal section taken on the line 2 2 in Fig. 3. Fig. 3 is a plan view from above of the complete machine. Fig. 4 is a detail plan view from above of the inclines for operating the sustaining-levers. Fig. 5 is a detail side view of the outer circular incline and sustaining-lever, showing also portions of the pattern and table in section. Fig. 6 is a cross-section through one of the holes in the table, showing the method of forming the pouring-gate. Fig. 7 is a side view, and Fig. 8 a vertical section, of the pressure-valve and its casing, taken on the line 3 3 in Figs. 9 and 10. Fig. 9 is a plan view from above of the valve-casing. Fig. 10 is a cross-section through the valve and its casing, taken on the line 4 4 in Figs. 7 and 8.

A revoluble table, $b$, is provided, having a series of equidistant holes or chambers arranged radially about its central stem, which is supported by the pedestal $c$, secured to the foundation. A ball-bearing is formed between the table and the pedestal to reduce the friction, and the outer edge of the table is further supported by the ring $c'$, provided with suitable flanges and secured to the foundation.

B' are the molding-boxes, which are placed on the surface of the table around the said holes or chambers, and are provided with guide-pins $y'$, engaging with corresponding holes in the table. A circular toothed rack, $b^2$, is formed on the under side of the table, which is geared into by the spur-wheel $k$, secured upon the shaft $l$, for revolving the table. A frame, $a$, is provided and securely bolted to the foundation. The shaft $l$ is journaled in bearings in the frame $a$, and is provided with a worm-wheel, $n$, which turns loose upon the said shaft and is prevented from slipping off it by the collar $n^2$.

A shaft, $p$, is journaled at the rear of the machine and is provided with the tight belt-pulley $o$, loose pulley $o'$, and the worm $q$, for communicating rotary motion to the worm-wheel $n$. The motion of the worm-wheel $n$ is communicated to the shaft $l$ by means of the clutch $m$, secured on the shaft. A worm, $q^2$, is also secured on the end of the shaft $p$, and gears into the worm-wheel W on the vertical shaft T, which is journaled in brackets secured to the frame $a$. A cam, R, is secured on the shaft T, and a wedge-lever, $n'$, is provided to the frame $a$, so that the table may be automatically started and stopped at periodic intervals.

The construction and operation of the clutch and its actuating mechanism are not further shown and described in this application, as the same are fully described and claimed in another application for Letters Patent for a molding-machine, Serial No. 213,286, filed of even date herewith.

G is the sand-reservoir, which is suspended over the table so that its lower end may register with the molding-boxes.

G' are brackets, which connect the reservoir with the foundation and assist in supporting it, the principal weight being taken by rods which suspend the reservoir from the roof of the molding-shop, or other fixed support. With this exception, the reservoir G is exactly the same, and is provided with sand-valves $G^2$, as shown and described in the other application aforesaid filed of even date herewith.

S S' are the levers for opening and closing the valves in the reservoir. These levers are pivoted to the bracket $S^2$, secured to the foundation, and their free ends are operated by the revolving cam $R^2$, secured upon the said shaft T. The cam $R^2$ operates the levers S S' in both directions, so that no weights are required. The motions of the levers S S' are exactly the same as the horizontal valve-operating levers shown and described in the aforesaid application filed of even date herewith.

A pattern, $h$, is placed in each of the holes or chambers of the table. Supporting-levers $j$, provided with weights $j'$, are pivoted on the pins $r$ at the lower end of each hole in the table. These levers support the pattern in the hole when in a horizontal position, as shown to the left hand in Fig. 2, and are retained in their horizontal position by the weight of the pattern. The pattern $h$ is cored out for lightness, and, as shown, is suitable for making a plated car-wheel—that is, one having no arms or spokes. The pattern shown makes that part of the mold for the wheel which comes in the lower box. The mold for the part of the wheel which comes in the top box with the pouring-gate is made in a separate machine similar to the present machine, and a chill for forming the tread of the wheel is interposed between the two molding-boxes after they have been removed to the casting-pit. The cores for making the hollow part of the center of the wheel and the hole through the hub are of course placed in position in the mold before the top box is placed above the chill. Each molding-box with the pattern resting on the arms $j'$ when horizontal is brought under the reservoir, and receives a charge of loose sand, which fills the space between the top of the pattern and the top of the molding-box. The table is then revolved until the molding-box filled with loose sand is brought centrally under the anvil $g$.

A hydrostatic cylinder, $d'$, is secured to the frame $a$ under the anvil $g$. A similar hydrostatic cylinder, $d$, is secured to the upper part of frame $a$, above the anvil $g$, and both of the said cylinders are provided with pistons, piston-rods, covers, and stuffing-boxes of ordinary construction. The cylinder $d'$ is provided with the ram $f'$, secured to its piston-rod and working in the guide $e'$, which guide is secured to the frame $a$, and is also coupled to the cylinder $d'$ by the bolt $e^3$. The cylinder $d$ is provided with the ram $f$, secured to its piston-rod and working in the guide $e$, secured to frame $a$, and also coupled to the cylinder $d$ by the bolt $e^2$. The anvil $g$ is permanently secured to the ram $f$, and reciprocates with it.

P' are pipes which connect the two outer ends of the cylinders $d\ d'$ with the opening P$^3$ of the pressure-valve case V.

P are pipes which connect the inner ends of the cylinders $d\ d'$ with the opening P$^2$ of the said valve-case.

F is the pressure-pipe, screwed into the opening F' in the valve-case, and H is the exhaust-pipe, screwed into the opening H' of the valve-case. The valve V' works balanced within its case, and is provided with the valve-stem V$^2$, passing through a stuffing-box of ordinary construction. When the valve is moved so as to place the pipes P' in communication with the pressure-pipe F, the pistons and rams of the two cylinders are simultaneously caused to approach each other, and when the pipes P are placed in communication with the said pipe F the said pistons and rams are forced apart in a similar manner.

The pressure-pipe F may be connected with any suitable pressure-pump, and water, compressed air, steam, or any other fluid may be used to actuate the pistons in the cylinders.

L is a lever pivoted on the side of the frame $a$, and pivotally connected to the end of the valve-stem V$^2$. The other end of the lever L is operated by the cam R', secured upon the continuously-revolving shaft T, previously described, so that the position of the pressure-valve is automatically reversed at stated intervals.

B is a ring or hoop surrounding the anvil $g$ and free to slide upon it. This ring is attached to the anvil by the levers D and links C, the said levers being pivotally connected to brackets E on the anvil. Three levers D are preferably used, but other numbers may also be used which will support the hoop B equally and allow it to slide freely.

D' is a tappet secured to the guide $e$. A separate tappet is provided for each lever D, but only one is shown, as they are all alike.

When the pistons $d\ d'$ are forced apart, the hoop B surrounds the anvil, as shown in Fig. 2; but the flange $f^2$ of ram $f$ is against the guide $e$ and the free ends of levers D bear against the tappets D', so that the hoop B is held suspended. The table is now revolved to bring the molding-box, previously filled with loose sand from the reservoir, directly under the anvil. Immediately the molding-box arrives in this position the clutch $m$ is automatically thrown out of connection with the worm-wheel $n$, and the table ceases to revolve. The automatic spring-latch N slips into a hole, N$^3$, in the table, one hole being provided for each molding-box used, and the table is held stationary. The continued revolution of the cams R$^2$ and R', secured on the shaft T, causes a charge of sand to fall into the molding-box, which has just been brought round under the reservoir, and the rams $f\ f'$ are caused to approach each other. Both of these actions take place simultaneously, and as before described. The ram $f'$ raises the pattern $h$. The supporting-levers $j$, being relieved of the weight of the pattern, are turned on the pivots $r$ by the action of the weights $j^t$ until they assume a vertical position, as shown to the right hand in Fig. 2. The ram $f$ lowers, and with it the anvil $g$ and hoop B. The hoop B, however, lowers more quickly than the anvil, because it is supported by the levers D, the free ends of which bear upon the tappets D' and allow the said hoop to descend onto the rim of the molding-box B'. The hoop B rests upon the said molding-box and forms, as it were, a continuation of it when the anvil $g$ has made but a small portion of its downward motion, and it consequently rests upon the rim of the molding-box when the pattern $h$ also has made only a small portion of its upward movement.

The function of hoop B is to prevent the loose sand in the molding-box from being spilled over onto the table, and to form a solid layer of compressed sand across the top of the molding-box. The molding-box is full of loose sand, and when the pattern commences to rise the sand rises with it into the hoop B until met by the descending anvil.

The continued movement of the anvil $g$ and pattern $h$ toward each other causes the loose sand in the molding-box to be compressed, and the under surface of the said anvil is so corrugated that this sand is evenly compressed over every part of the surface of the pattern. The position of the various parts of the machine when the compression is completed is clearly shown in Fig. 2.

The movements of the rams $f$ and $f'$ are substantially synchronous. If one should be in advance of the other, from unequal friction of working parts or other cause, during any part of the stroke, the complete operation of the pattern and the moving anvil or resistance-block is the same. The lower ram, $f'$, stops at an accurately-determined point, so that the sand in contact with the pattern is compressed and projects a certain fixed distance below the lower edge of the molding-box. The anvil and ram $f$ are also accurate in stopping at one place; but this is not so important, all that is necessary being that the corrugations on the under side of the anvil should not pass below the level of the top edge of the molding-box. The projections of sand above the top of the box are afterward cut away, so that an even surface is formed level with the top edge of the box, upon which edge and surface the whole mold may rest when in the casting-pit. The continued revolution of cam R' now reverses the pressure-valve, and the rams $f$ and $f'$ are forced apart. The anvil rises with the ram $f$, but the pattern $h$ remains suspended upon the ends of the supporting-arms $j$, which are now vertical, the pattern being in contact with the face of the mold for the portion of the car-wheel which has been formed by it in the sand. The hoop B remains stationary on the edge of the molding-box until the free ends of levers D, which rise more quickly than the anvil, strike up against the tappets D'. The anvil then completes its upstroke. The hoop B is quickly raised off the molding-box by the levers D and links C, and arrives at its highest position simultaneously with the arrival of the anvil at its highest position. In order to automatically disengage the latch N from the hole N³ in the table just before the table is about to revolve, the cam N² is provided and secured to the end of the continuously-revolving shaft T. The cam N² strikes the projection N⁴ of the said latch and draws it back directly the rams have been drawn apart to their full extent. The clutch $m$ is then caused to engage automatically with the wheel by means of the lever $n'$ and cam R, previously described, and the table commences to revolve. As soon as the hole N³ has moved past the end of the latch N, the cam N² leaves the projection N⁴, and the spring N' causes the end of the latch to bear against the edge of the table, ready to engage automatically with the next hole N³ as it comes round. When the table revolves, the rammed-up molding-box B' is carried with it. The rammed-up sand projects in places above the rim of the said molding-box, the projections being due to the irregular under surface of the anvil adopted to secure the uniform compression of the sand between it and the pattern. In order to remove these projections and leave an even surface of sand level with the upper edge of the molding-box, so that it can be turned over and stood upon the floor of the casting-pit after being removed from the machine, the knife $z$ is provided.

A is a vertical stem secured in the center of the table $b$ and turning with it. A sleeve, A', is slipped over the stem A and is held down by a screw-bolt and washer at the top of the stem, which revolves in the said sleeve. A screw-bolt, $z'$, is journaled in a lug on the sleeve A', and the end of the screw bears upon the flange at the base of it. A similar screw-bolt, $z'$, is journaled in a lug on the bracket $z^2$, which is secured to the foundation at one side of the table. Each end of the knife $z$ has a hole correspondingly screw-threaded and engaging with the screw-threads of the bolts $z'$ $z'$, so that the said knife may be adjusted vertically to cut the sand off the top of the molding-box level with the upper edge of it by turning the bolts $z'$ $z'$ in the lugs in which they are journaled.

J and J' are two inclines bolted to the foundation under the table. These inclines are segments of circles concentric with the table.

The weights $j'$ of the sustaining-levers strike the inclines after the sand has been cut off level by the knife $z$. The levers $j$ are slowly turned to their horizontal positions by the continued revolution of the table and the pressure of the inclines against the weights. The pattern in the hole or chamber of the table is thus allowed to descend gently by its own weight, leaving the mold and the box B' ready for removal to the casting-pit.

A revolving brush, $t$, is provided for removing the loose sand from the surface of the table, around the holes or chambers in which the patterns are placed, before the empty molding-boxes are placed in position. The revolving brush $t$ is mounted on the spindle S, journaled in the boxes $x^2$. A bracket, $y$, is secured to the foundation at one side of the table for carrying one end of the brush-spindle and the gear for driving it. Screws $s'$ are journaled in holes in the boxes $x^2$, and are connected to them by the cross-pins $t^3$, which pass through the said blocks and through annular grooves in the ends of the said screws. Each screw $s'$ works in the correspondingly-screw-threaded hole of a lug formed on the bracket $y$ and sleeve A', respectively, so that the brush can be adjusted with respect to the table by turning the screws s'. A vertical shaft, v, is journaled in boxes x' x', and has the bevel-wheel w' screwed on it and engaging with a similar bevel-wheel secured upon the brush-spindle S. A friction-wheel, w, is also secured on the shaft v and bears upon the outer edge of the table, so that rotary movement is communicated from the table to the brush. The bracket y is further provided with screw-threaded holes and the screws u, working in the said holes and bearing against the boxes x' x', so that the pressure of the friction-wheel w against the edge of the table b may be adjusted.

The pattern h', for the part of the mold of the car-wheel which comes in the top of the molding-box, is shown in Fig. 6, with the pattern $h^2$, for forming the pouring-gate, secured to it. The upper surface of the pattern $h^2$ has corrugations to form the upper part of the mold, similar to those shown on the pattern for forming the lower part of the mold. The anvil the pattern $h^2$ works under is also corrugated, so that the sand in the molding-box may be compressed to a uniform density all over the surface of the pattern.

What I claim is—

1. In a molding-machine, the combination of a table having a hole or chamber, a pattern sliding in the said hole, and unequally-balanced arms pivoted to the table under the pattern, so that they may automatically follow and support it at two different elevations.

2. In a molding-machine, the combination of a revoluble table having a series of equidistant holes or chambers arranged radially about its center, a pattern sliding in each hole, and unequally-balanced arms pivoted to the table under each pattern, so that they may automatically follow and support them at two different elevations.

3. In a molding-machine, the combination of a table having a hole or chamber, a pattern sliding in the said hole, arms pivoted to the table under the pattern, so that they may support it at two different elevations, and weights secured to the said arms for automatically turning them on their pivots when the pattern is raised.

4. In a molding-machine, the combination of a revoluble table having a hole or chamber, a pattern sliding in the said hole, arms pivoted to the table under the pattern, so that they may support it at two different elevations, weights secured to the arms for automatically turning them on their pivots when the pattern is raised, and stationary inclines for restoring the said arms to their original position and lowering the pattern when the table is revolved.

5. In a molding-machine, the combination of a table having a hole or chamber, a pattern sliding in the said hole, unequally-balanced arms pivoted to the table under the pattern, so that they may automatically follow and support it at two different elevations, and a hydrostatic cylinder for raising the pattern.

6. In a molding-machine, the combination of a table having a hole or chamber, a molding-box resting on the table around the said hole, a pattern sliding in the hole of the table, a hydrostatic cylinder under the table for raising the said pattern, an anvil supported over the molding-box, a hydrostatic cylinder for lowering the anvil, pressure-pipes provided with a valve connecting with the two opposite ends of the said cylinders, so that the said pattern and anvil may simultaneously compress the sand between them in the molding-box, mechanism for revolving the table, provided with a disengaging-clutch, and continuously-revolving cams operating the said valve and clutch intermittently and alternately at fixed intervals.

7. In a molding-machine, the combination of a revoluble table having a hole or chamber, a molding-box resting on the table around the said hole, a pattern sliding in the hole of the table, arms pivoted to the table under the pattern, so that they may support it at two elevations, a hydrostatic cylinder under the table for raising the pattern, an anvil over the molding-box, a hydrostatic cylinder for lowering and raising the anvil, pressure-pipes connecting the opposite ends of the said cylinders, so that they work simultaneously in opposite directions, weights for automatically turning the supporting-arms on their pivots and holding the pattern raised up after its cylinder ceases to support it and the anvil has been raised, and stationary inclines for restoring the said arms to their original positions and lowering the pattern when the table is revolved from under the anvil.

8. In a molding-machine, the combination of a table, a molding-box resting on the table, a sliding anvil over the molding-box, a stationary guide for the anvil, a hoop surrounding the anvil, levers pivotally connecting the anvil with the hoop, and tappets secured to the guide and bearing on the free ends of the said levers for sustaining the said hoop when the anvil is raised.

9. In a molding-machine, the combination of a molding-box, a sliding anvil over the molding-box, and a sliding hoop pivotally connected to the anvil, whereby the hoop becomes an extension of the molding-box prior to the descent of the anvil.

10. In a molding-machine, the combination of a molding-box, a sliding anvil over the molding-box, having brackets E, a stationary guide for the anvil, a hoop surrounding the anvil, the levers D, pivoted to the said brackets, the links C, connecting the levers with the hoop, and the tappets D', secured to the anvil-guide and operating in connection with the free ends of the levers, as set forth.

11. In a molding-machine, the combination of a revoluble table having a hole in its outer edge, a spring-latch automatically engaging with the said hole in the table, a pattern sliding in a chamber in the table, a molding-box resting on the table circumjacent to the pattern, a hydrostatic cylinder under the table for raising the pattern, an anvil over the molding-box, a hydrostatic cylinder for lowering the anvil, pressure-pipes provided with a valve connecting the opposite ends of the said cylinders, so that they work simultaneously in opposite directions, mechanism for revolving the table, provided with a disengaging clutch, continuously-revolving cams operating the said valve and clutch intermittently and alternately at fixed intervals, and a continuously-revolving cam engaging with a projection on the latch, withdrawing it from the hole when the table is about to revolve, and holding the said projection until the hole in the table has passed by the end of the latch.

12. In a molding-machine, the combination of a reservoir for sand, provided with valves for delivering a measured charge from the upper to the lower part of the reservoir, levers pivotally connected to the said valves, and a continuously-revolving cam operating positively upon the said levers and opening and closing the sand-valves at stated intervals.

13. In a molding-machine, the combination of a revoluble table having a series of equidistant holes or chambers, a pattern sliding in each hole, molding-boxes resting on the table around the holes, a sand-reservoir provided with a sand-delivery valve over one of the molding-boxes, a sliding anvil over the next adjacent molding-box, two hydrostatic cylinders placed, respectively, under the pattern and anvil and over the anvil, a pipe connecting the opposite ends of the said cylinders and provided with a pressure-valve, so that the said pattern and anvil may simultaneously compress the sand between them in the molding-box, a continuously-revolving shaft, and two cams secured on the said shaft for simultaneously opening the pressure and sand valves aforesaid at stated intervals.

14. In a molding-machine, the combination of a revoluble table, a molding-box resting on the table, a sliding anvil for compressing the sand on top of the molding-box, and a stationary knife for cutting off the surplus compressed sand on top of the box as the table revolves.

15. In a molding-machine, the combination of a revoluble table, a molding-box resting on the table, a sliding anvil for compressing the sand on top of the molding-box, and a vertically-adjustable stationary knife for cutting off the surplus sand from the top of the box as the table revolves.

16. In a molding-machine, the combination of a revoluble table provided with a central projecting stem, a stationary sleeve journaled on the stem, a stationary bracket secured at one side of the table, and a knife provided with screws journaled in the sleeve and bracket, so that the vertical plane of the knife may be adjusted, as and for the purpose set forth.

17. In a molding-machine, the combination, with a revoluble table, of a brush supported above the table and in contact with its surface for clearing away the sand.

18. In a molding-machine, the combination, with a revoluble table, of a revolving brush journaled in stationary boxes above the table, said brush being in contact with the surface of the table and for clearing away the sand.

19. In a molding-machine, the combination, with a revoluble table, of a vertically-adjustable revolving brush journaled in stationary boxes above the table, said brush being in contact with the table and for clearing away the sand.

20. In a molding-machine, the combination of a revoluble table provided with a central projecting stem, a stationary sleeve journaled on the stem, a stationary bracket secured at one end of the table, vertically-adjustable boxes provided with adjusting-screws connecting them with the said sleeve and bracket, and a revolving brush journaled in the said boxes for clearing away the sand from the surface of the table.

21. In a molding-machine, the combination of a revoluble table, a brush mounted on a central spindle journaled in stationary boxes above the table, and intermediate gearing connecting the brush-spindle with the table, so that the brush may revolve simultaneously with the table and clear away the sand from its surface.

22. In a molding-machine, the combination of a revoluble table, a brush mounted on a central spindle journaled in boxes above the table, a friction-wheel secured on a vertical spindle and bearing against the outer edge of the table, screws for adjusting the pressure of the friction-wheel upon the edge of the table, and bevel-gearing connecting the two spindles together, so that the brush may revolve simultaneously with the table and clear away the sand from its surface.

In testimony whereof I affix my signature in presence of two witnesses.

GEORGE GUNTZ.

Witnesses:
HERBERT W. T. JENNER,
WILLIAM FITCH.